Nov. 7, 1961  M. AMIRAULT ET AL  3,007,724
SHAFT PACKING
Filed Aug. 6, 1959  2 Sheets-Sheet 1
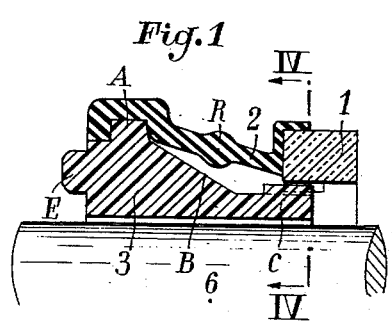
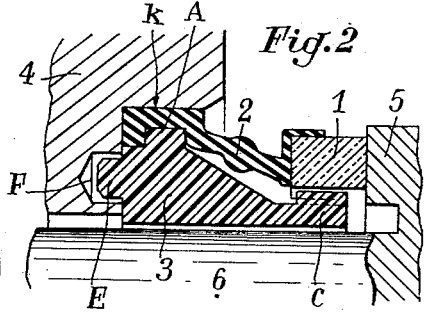
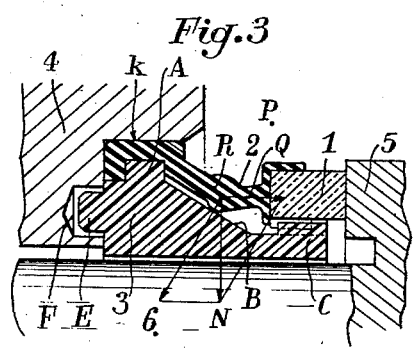
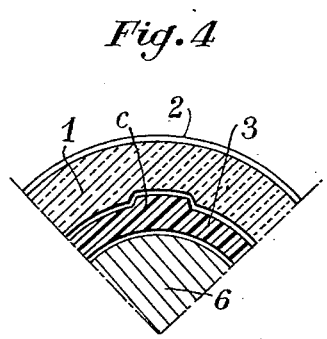
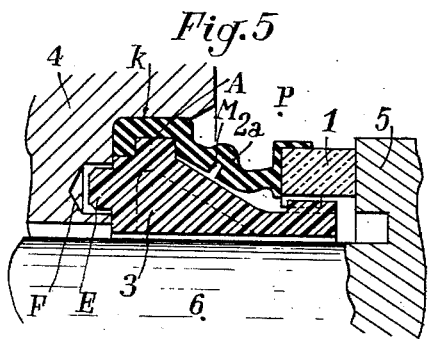
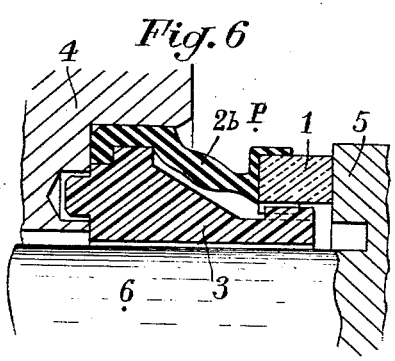

United States Patent Office 3,007,724
Patented Nov. 7, 1961

3,007,724
SHAFT PACKING
Maxime Amirault, 32 Ave. Le Notre, Sceaux, France, and Paul Destoumieux, 16 Ave. Sainte Foy, Neuilly-sur-Seine, France
Filed Aug. 6, 1959, Ser. No. 832,051
Claims priority, application France Dec. 10, 1958
5 Claims. (Cl. 286—11.14)

This invention is concerned with an improved and— so far as the applicants are aware—novel design of sealing devices be mounted between a rotary part and a fixed part, and intended notably for pumps of the type handling corrosive acids or fluids.

In the presence of certain corrosive acids or fluids, no metal can resist their corrosive action and to handle them very simple pumps, generally of the rotary type, have been developed, all the components of these pumps being made of synthetic material selected with a view to withstand the corrosive action of said fluids. Regarding the fluid-tightness between the shaft and the casing or fixed part, as gland-packing systems are unreliable as far as a lasting tightness is concerned, more recently developed devices of the lateral friction type are now used which consist mainly of a friction ring connected through a rubber or like diaphragm to the shaft or casing so as to be in fluid-tight engagement therewith, this friction ring being urged by a spring against a machined face of the casing or shaft. Now as in the specific field dealt with herein any metal has to be definitely discarded, even the spring must be dispensed with. As a rule, its elastic action is provided by the inherent elasticity of the diaphragm arranged to provide an axial thrust applied to the aforesaid friction ring which is thus pressed against its relevant seat. However, none of the systems so far proposed is entirely satisfactory and reliable, due notably to the remanence of the rubber material, which after a certain time of operation becomes the cause of a reduction in the axial thrust attended by leakages, notably in arrangement subjected to relatively high pressures.

It is the object of this invention to provide a packing or seal to be disposed between two parts in relative rotation to each other, which is particularly suitable for use in pumps handling a corrosive fluid, this packing being remarkable notably in that it can be manufactured without using any metal component and that it is capable of operating in an efficient and reliable manner during a useful life considerably longer than that of hitherto known packings of this general character.

In the device of this invention the resilient annular diaphragm secured to one of the parts and urging the friction ring against the other part, has its inner surface opposite to the outer surface receiving the fluid pressure so disposed as to surround a bearing surface of a rigid support solid with the first part and extending towards the other part, the diaphragm urged against this bearing surface by the fluid pressure tending to expand in the axial direction and consequently to increase the axial thrust exerted by the friction ring against the other part.

From the foregoing it appears that the axial thrust exerted by the friction ring increases with the pressure of the fluid to be sealed. Therefore, this device is self-adjusting. Moreover, when the device is inoperative the tension exerted by the material constituting the annular diaphragm is relatively low, thus preserving most efficiently the physical properties of this material.

Other features and advantages of this invention will appear as the following description proceeds with reference to the accompanying drawings forming part of this specification and illustrating diagrammatically by way of example a few typical forms of embodiment of the packing of this invention. In the drawings:

FIGURES 1, 2 and 3 are half radial sections of a first device shown respectively in its free condition prior to its mounting, mounted on the two parts in the inoperative condition, and in the operative condition resulting from the application of the fluid pressure to the device;

FIGURE 4 is a cross-section taken upon the line IV—IV of FIG. 1; and

FIGURES 5 to 11 are devices differing from the device of FIGS. 1 to 3 by the shape of the diaphragm or the relative arrangement of its components.

Figure 7:
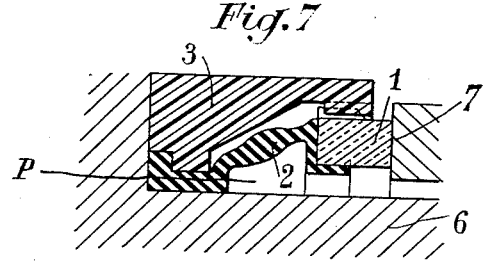
Figure 8:
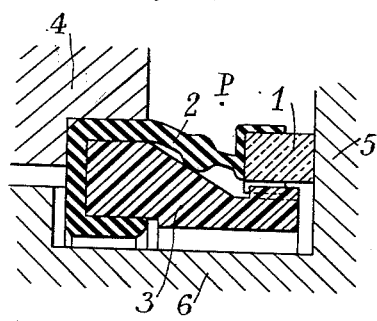
Figure 9:
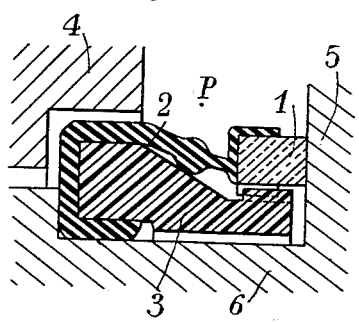
Figure 10:
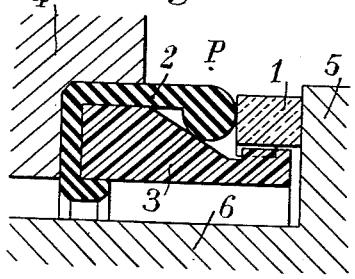
Figure 11:
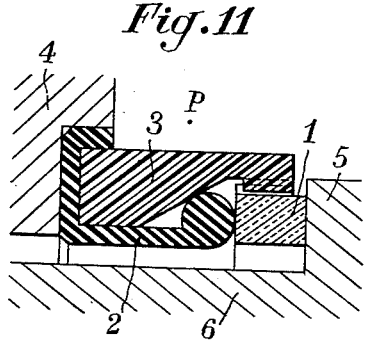

In the devices shown in FIGS. 3 and 5 to 11, the reference character P designates the space which, during the operation of the device is occupied by the fluid under pressure.

The device illustrated in FIG. 1 consists of a friction ring 1 connected by gluing or cementing to a diaphragm 2 of substantially frustoconical configuration, the diaphragm end opposite to the ring fitting on a rigid support 3 formed with an extension having a tapered outer surface B terminating with a cylindrical annular portion C having its outer periphery engaged by the friction ring 1. This ring is held against rotation in relation to the component 3, as shown in FIG. 4, by the provision of spaced splines or ribs permitting the free axial displacement of the ring 1 in relation to the support 3.

In the assembled condition and as illustrated in FIG. 2 the diaphragm end opposite to the end engaging the friction ring 1 is fitted in a recess K provided to this end in a casing 4 of a pump body or like fixed part, this diaphragm end being tightly held in this recess K by an annular rib A formed on the rigid support 3. This support 3 carries on its rear face one or more projections E engaging one or more recesses or blind holes F so as to retain angularly the support 3 in the casing 4. The friction ring 1 engages its mating surface formed on the annular portion 5 of the pump shaft 6 and is pressed thereby to compress the intermediate portion of the diaphragm which remains free. The resulting reaction causes the friction ring 1 to be pressed with a certain force against its mating surface of the annular portion 5 of the pump shaft. The fluid-tightness between the shaft and the casing is thus obtained by the diaphragm 2 force-fitted in the casing 4, the friction ring 1 engaging with a certain pressure its companion surface on the shaft portion 5, the contact faces of these two last-mentioned elements being in principle either perfectly flat or adequately lapped with each other. During the rotation, the friction ring 1 slides on the mating face of member 5 rotating bodily with the shaft 6 and the fluid-tightness is properly preserved. Due to the pressure exerted by the fluid in the space P (FIG. 3), the diaphragm 2 is compressed towards the shaft axis as shown by the arrow N, and its intermediate portion formed with a swelling contacts the tapered surface B of support 3 and tends to slide therealong in the direction of the friction ring 1. The ensuing reaction causes the diaphragm 2 to exert an axial thrust in the direction of the arrow Q, thus increasing the pressure already exerted in the inoperative conditions by the diaphragm 2 on the friction ring, so that the device will adjust itself automatically to the fluid pressure conditions prevailing and will provide the necessary fluid-tightness.

The devices illustrated in FIGS. 5 and 6 differ from the preceding one only by the contour of the intermediate portion of the diaphragm. The diaphragm 2a of FIG. 5 has a groove formed internally of its central swelling in order to increase the flexibility of the diaphragm. The diaphragm portion 2b of FIG. 6 is simply tapered and will bulge, as shown, under the influence of the axial compression.

Without departing from the principle of the invention, different devices may be obtained for example by reversing the mounting as illustrated in FIG. 7 in case the fluid pressure were directed outwardly instead of inwardly, the device being secured on the shaft 6 and the friction ring 1 engaging a machined surface 7 of the casing. In certain cases it is also possible to dispense with the angular-positioning projections and splines or ribs. The support may be formed with a polygonal radial section instead of a circular section. Besides, if desired and appropriate, the gluing or cementing of the friction ring on the diaphragm may be dispensed with. Finally, the intermediate portion of the diaphragm may be formed with several folds. The diaphragm contours illustrated in FIGS. 8, 9 and 10, 11 are also within the scope of this invention.

The forms of embodiment illustrated in FIGS. 3, 5, 6, 8, 9 and 10 are applicable to those cases wherein the space in which the fluid pressure is exerted forms an annular chamber surrounding the diaphragm. The forms of embodiment shown in FIGS. 7 to 11 are applicable to those cases wherein the fluid space surrounds the shaft but lies within the diaphragm. In both cases the diaphragm may be solid either with the casing or with the shaft, as shown respectively in FIG. 9 and in FIGS. 7, 11.

The very shape of the support 3 may be modified considerably with respect to the examples given herein without departing from the spirit and scope of the invention, as the efficiency of the device forming the subject-matter of this invention is based on the relative shapes of the bearing surface B of support 3 and of the diaphragm 2 providing the above-described joint effect. Thus, for example, and notably in those cases where the diaphragm consists of a relatively rigid synthetic material, the support 3 may be formed with a cylindrical bearing surface B surrounded by a barrel-shaped diaphragm having its convexity directed externally of the support and internally of the mass of fluid under pressure.

Finally, the support 3 instead of consisting of a solid block as shown may be reduced to a simple wall of a thickness sufficient to provide a convenient support for the bearing surface B.

What we claim is:

1. A packing for sealing a joint against the passage of a liquid, which comprises an annular elastic diaphragm formed with two opposite faces of which one face contacts the liquid, and with two coaxial circular contours, a rigid annular support having one end force fitted in one of two members in relative rotation and fastening one of said circular contours of said annular elastic diaphragm with one of two members, said annular support having an axial extension from said end which forms a tapered bearing surface registering with the other face of said annular elastic diaphragm, said annular elastic diaphragm comprising one portion which on the one hand extends from said first circular contour with a moderate clearance about said tapered bearing surface of said annular support and on the other hand engages said tapered bearing surface when the liquid exerts a pressure against said elastic diaphragm, and a friction ring secured on said second circular contour of said annular elastic diaphragm in front of a radial friction surface of the other one of said two members in relative rotation, said friction ring being urged for sealing frictional engagement with said friction surface by the expansion occurring in said annular elastic diaphragm under the influence of its compression by the liquid against said tapered bearing surface of said rigid annular support.

2. A packing as set forth in claim 1, wherein said rigid annular support is formed at one end, after its tapered bearing surface, with a cylindrical extension on which said friction ring is slidably mounted.

3. A packing as set forth in claim 2, wherein said cylindrical extension is formed with longitudinal ribs engaging corresponding grooves formed in said friction ring so as to prevent said friction ring from rotating relative to said rigid annular support and said first part.

4. A packing as set forth in claim 1, wherein said annular elastic diaphragm comprises, between its two axial contours, a circular swelling adapted to become flattened against said tapered bearing surface under the influence of the liquid pressure.

5. A packing as set forth in claim 4, wherein said circular swelling has at least one circular fold formed therein on the side of said other face of said annular elastic diaphragm.

References Cited in the file of this patent
UNITED STATES PATENTS

| | | |
|---|---|---|
| 2,779,611 | Wernert | Jan. 29, 1957 |
| 2,884,267 | Kosatka | Apr. 28, 1959 |